UNITED STATES PATENT OFFICE.

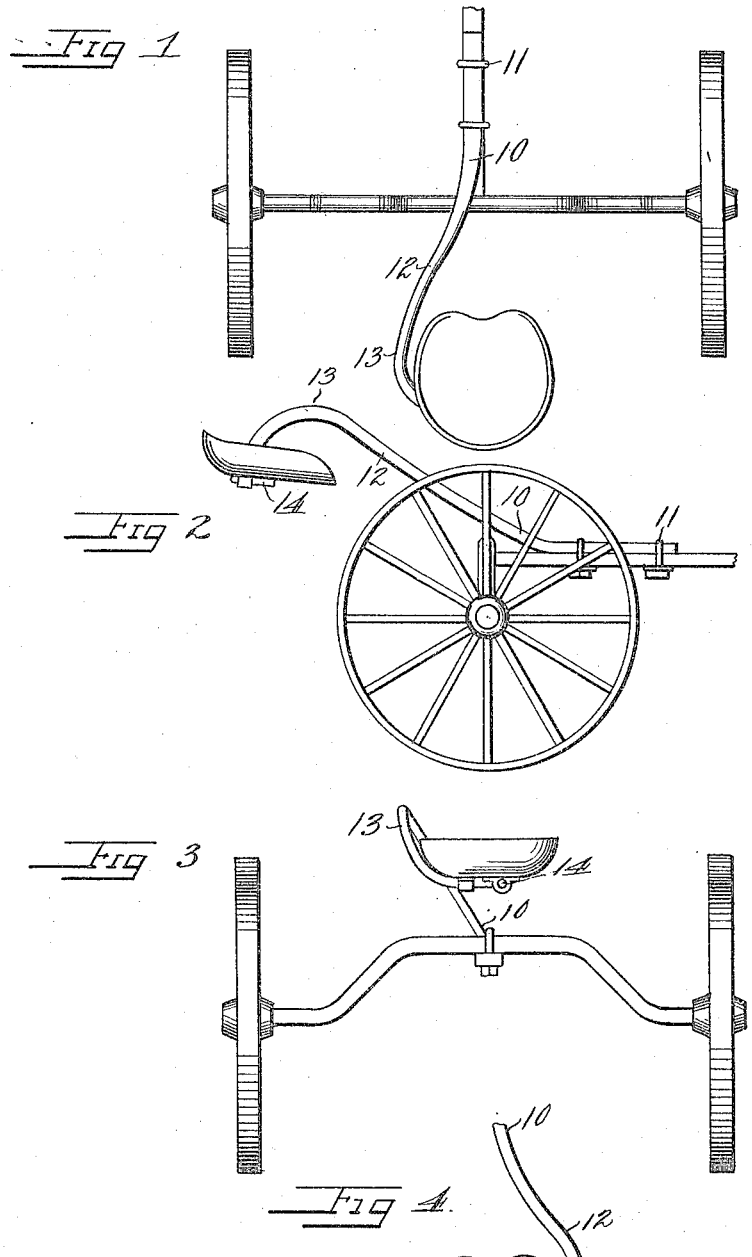

ROBERT SCHLEUSENER, OF BANCROFT, NEBRASKA.

RIDING ATTACHMENT FOR AGRICULTURAL MACHINES.

1,207,225.  Specification of Letters Patent.  Patented Dec. 5, 1916.

Application filed March 1, 1916. Serial No. 81,458.

*To all whom it may concern:*

Be it known that I, ROBERT SCHLEUSENER, a citizen of the United States, residing at Bancroft, in the county of Cuming, and State of Nebraska, have invented certain new and useful Improvements in Riding Attachments for Agricultural Machines; and I do hereby declare the following to be a full, clear, and exact description of the invention, such as will enable others skilled in the art to which it appertains to make and use the same.

This invention relates to improvements in riding attachments for agricultural machines.

One object of the invention is to provide a novel and simple seat and support therefor which is of such construction that the driver can more quickly and easily get into and out of the seat.

Another object is to provide a seat with a support so constructed and arranged that it not only serves to support the seat but provides a handle for use of the driver.

Other objects and advantages will be apparent from the following description when taken in connection with the accompanying drawing.

In the drawing, Figure 1 is a plan view of a portion of an agricultural machine showing my riding attachment applied thereto; Fig. 2 is a side elevation; Fig. 3 is a rear elevation; Fig. 4 is a bottom plan view.

Referring particularly to the accompanying drawing, 10 represents a pole, formed preferably of metal and having one end secured to the frame of the agricultural machine in the usual manner, as indicated at 11. This pole extends rearwardly, and is bent to extend laterally as indicated at 12, from whence it curves upwardly and rearwardly as shown at 13. The end of the pole is then directed laterally and secured to the underside of the seat 14.

The portion 13 extends above and to one side of the seat, so that a convenient handle is formed which the driver can grasp to steady himself on the seat.

By reason of the laterally curved portion 12, and the fact that the pole is secured to the seat from the side, instead of directly in the front as is usually done, there is no necessity for straddling or stepping over the pole when getting into or out of the seat. The driver can simply grasp the handle portion 13 and immediately and easily drop out of the seat. In like manner by grasping the handle and stepping up on a part of the frame of the machine, the driver can quickly and easily regain his position on the seat.

What is claimed is:

A riding attachment for an agricultural machine comprising a resilient bar detachably carried by the machine and extending rearwardly therefrom, said bar having its rear portion curved laterally and upwardly and again in a lateral direction, and a seat member secured to the last-named laterally directed portion of the bar.

In testimony whereof I affix my signature in the presence of two witnesses.

ROBERT SCHLEUSENER.

Witnesses:
ALLEN G. BURKE,
WILMET S. ROBERTS.

Copies of this patent may be obtained for five cents each, by addressing the "Commissioner of Patents, Washington, D. C."